United States Patent [19]

Wilkinson

[11] Patent Number: 5,525,236

[45] Date of Patent: Jun. 11, 1996

[54] REVERSE OSMOSIS PURIFICATION OF WATER

[76] Inventor: Kenneth Wilkinson, 1010 Glenwood Blvd., Waynesboro, Va. 22980

[21] Appl. No.: 420,810

[22] Filed: Apr. 12, 1995

[51] Int. Cl.$^6$ .............. B01D 61/00; C02F 1/44
[52] U.S. Cl. .............. 210/651; 210/490; 210/652; 210/500.29; 210/500.38; 210/580.4; 210/500.41; 264/41; 264/49
[58] Field of Search ............... 210/490, 651, 210/652, 500.29, 500.38, 500.4, 500.41; 264/41, 49

[56] References Cited

U.S. PATENT DOCUMENTS

| | | | |
|---|---|---|---|
| 4,268,641 | 5/1981 | Koenig et al. | 525/367 |
| 4,280,970 | 7/1981 | Kesting | 525/54.21 |
| 4,976,897 | 12/1990 | Callahan et al. | 210/490 |
| 5,266,391 | 11/1993 | Donato et al. | 210/490 |

*Primary Examiner*—Morton Foelak
*Attorney, Agent, or Firm*—Leander F. Aulisio

[57] ABSTRACT

Addition of minor amounts of polymeric ethers, having oxyalkylene tentacles dangling from a carbon backbone, to ultrafiltration membranes improves rate of flow of purified water.

33 Claims, No Drawings

REVERSE OSMOSIS PURIFICATION OF WATER

BACKGROUND OF THE INVENTION

The present invention relates to polymeric additives for ultrafiltration membranes and processes for purification of water.

The process of reverse osmosis involves the transport of solvent by pressure gradient larger and opposite to osmotic gradient. Ultrafiltration membranes are employed as suitable mediums for reverse osmosis. In the past, it has been an object of ultrafiltration to produce a purified water permeate that is free of organic contaminants, inorganic contaminants, salts, bacteria and microorganisms.

Components which are retained in an ultrafiltration membrane are called collectively concentrate or retentate. Materials which pass through the membrane are called filtrate, ultrafiltrate or permeate.

Membranes are typically selected on how they transport the fluids therethrough. The rate of transport through a membrane is a function of its permeability, generally referred to as flux. Liquid permeation for example, involves the permeation of feed components from the liquid phase on one side of the membrane to the liquid phase on the other side at a controlled rate.

Microporous membranes can be classified into two general types: one type in which the pores are interconnected, i.e., a closed-cell membrane, and the other type in which the pores are essentially interconnected through passages which may extend from one exterior surface or surface region to another, i.e., an open-celled membrane.

Currently available microfiltration membranes are made from essentially hydrophobic polymers such as cellulose nitrate, cellulose acetate, blends of cellulose nitrate and cellulose acetate, cellulose triacetate, polycarbonate, and polysulfone, as well as other polymers. Membranes of these materials, once formed, are usually rendered hydrophilic by the inclusion of surfactant in the casting solution or by a post membrane formation treatment consisting of immersing the material in an aqueous solution of the surfactant. In both cases, although wettability is imparted, the membranes typically contain between 2 and 6% of water extractable (leachable) materials which are potential contaminants of any filtrate.

Another approach to application of a coating to the microporous membrane is to change the surface of the hydrophobic microporous membrane to a hydrophilic one. This is especially true when polyolefinic films, a preferred type of polymeric material often employed in the manufacture of microporous membranes, are employed. Because these films are not "wetted" with water and most aqueous solutions, they could not be used advantageously in various applications. Such proposals have been put forth in the past to overcome these problems, such as exemplified by U.S. Pat. Nos. 3,853,601; 3,231,530; 3,215,486 and Canadian Patent No. 981,991 which utilize a variety of hydrophilic coating agents or impregnants. Such coating agents or impregnants, although effective for a limited period of time tend to be removed in a relatively short period of time by solutions which contact the membrane.

As discussed above, the selectivity of separation membranes is an important factor in the satisfactory operation of membrane separation processes. In addition, membrane properties such as flux and resistance to chemical, biological and physical degradation also affect the efficiency of separation processes.

Of course, there have been many efforts to develop membranes which function efficiently in separation processes. Typical of such efforts include the development of composite-type membranes such as those disclosed in U.S. Pat. Nos. 4,242,159; 4,260,652; 4,277,344 and 4,388,189. These membranes include a microporous support having coated thereon a thin layer of polymeric material. However, previously known composite membranes have not been completely satisfactory since they can or may exhibit a variety of defects which affect physical, chemical and biological degradation resistance and flux, and thus the overall efficiency of the membrane processes for which they are used.

U.S. Pat. No. 4,268,641 (Koenig et al.) discloses thickening agents comprising copolymers of acrylic acid and polyoxyalkylene(meth)acrylates. The copolymers contain about 1 to about 10 mole % of the nonionic (meth)acrylate. There is no disclosure relating to the formation of ultrafiltration membranes.

U.S. Pat. No. 3,341,627 (Wilkinson) discloses a polymeric anti-static agent comprising polymers prepared from alkylphenoxy polyethylene glycol acrylate monomers. There is no disclosure relating to the formation of ultrafiltration membranes.

U.S. Pat. No. 4,280,970 (Kesting) discloses hydrophilic membranes consisting essentially of the graft copolymer of an active hydrogen containing membrane forming polymer, a diisocyanate grafting link, and an active hydrogen containing polyoxyethylene polymer. The membrane forming polymer can be a cellulosic polymer or nylon. The grafting operation can be performed either before or after membrane formation. IGEPAL CO-990 is disclosed (column 3, line 44). The membranes can be employed in ultrafiltration processes. There is no disclosure with reference to a polymeric additive for ultrafiltration membranes.

U.S. Pat. No. 5,266,391 (Donato et al.) discloses a coated microporous membrane comprising a microporous polymeric film support having specified physical attributes and coated on at least one side with a polymer such as polyethylene oxide. In a preferred embodiment, the support is open-celled.

U.S. Pat. No. 4,976,897 (Callahan et al.) discloses a composite membrane having a microporous support coated with a UV curable polymer composition. The UV curable polymer can have additives such as nonylphenoxypolyoxyethylene surfactants (IGEPAL-type) (column 5, line 30).

U.S. Pat. No. 3,717,689 (Tanaka et al.) discloses copolymers prepared from a monoester and a diester. The monoester is a mixed polyoxyalkylene ester of (meth)acrylic acid. There is no disclosure to the use of the copolymer as additives in the preparation of ultrafiltration membranes.

SUMMARY OF THE INVENTION

An object of this invention is to provide polymeric additives and a process for preparing ultrafiltration membranes containing the additives.

Another object of this invention is to provide a process for the preparation of purified, desalinated water. The process comprises the steps of obtaining a microporous ultrafiltration membrane comprising a hydrophobic polymer and a polymer prepared by the addition polymerization of a polyoxyalkylene alkyl phenyl ester of (meth)acrylic acid; contacting an amount of seawater with the ultrafiltration membrane under reverse osmosis conditions to effectively separate water from salts, bacteria, organic contaminants, inorganic contaminants and microorganisms; and withdrawing a purified stream of water.

A composite microporous ultrafiltration membrane is disclosed which comprises a hydrophobic polymer and a water-insoluble addition polymer of an alkylphenoxy polyalkylene glycol acrylate having the formula:

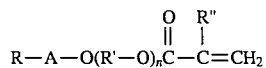

wherein R is an alkyl radical of from 5 to 20 carbon atoms, A is a phenylene radical, R' is a member selected from the group consisting of propylene ethylene and mixtures thereof, R" is a member selected from the group consisting of hydrogen and methyl, and n is an integer from 20 to 50. In a preferred embodiment, RA- is a nonyl phenyl radical, R" is hydrogen, and R' is ethylene. Preferably, the composite membrane contains the hydrophobic polymer which is a member selected from the group consisting of cellulosic polymers, polyamides, polycarbonates and polysulfones. It has been observed that best results are obtained when the water-insoluble addition polymer is present in an amount of about 1% to about 10% by weight based on the membrane.

DETAILED DESCRIPTION OF THE INVENTION

Ultrafiltration membranes are prepared by gelation or precipitation of a species from a soluble phase (phase inversion). The polymeric material is dissolved in a mixture of miscible solvents and nonsolvents. The solution is deaerated and cast to produce a film whose surface contacts the nonsolvent diluent miscible with the solvent forming a membrane skin. The membrane skin in highly stressed due to polymer consolidation. The surface of the skin tears at polymer-poor sites, forming cracks or pores. The pores develop into "fingers" by drawing precipitating polymer from the bottom to the side of the pores. This process advances along a moving boundary into the polymer film, preventing additional pores from forming on the walls. Any polymer solution trapped behind the precipitated walls continues to gel into an open-sponge structure. The final structure of the membrane is dependent upon the materials employed (polymer composition, molecular weight distribution, solvent system, etc.) and the method of preparation (solution viscosity, evaporation time, humidity, etc.).

Ultrafiltration is a pressure-driven filtration separation occurring on a molecular scale. In reverse osmosis filtration four basic membrane designs are utilized: plate-and-frame, tubular, spiral-wound, and hollow-fiber. The spiral-wound and hollow-fiber designs are those which are commercially used.

Hollow-fiber membranes have become popular in the recent era. A hollow-fiber is a capillary having a diameter of ≦1 mm, and whose wall functions as a semi-permeable membrane. The fibers are cylindrical membranes that permit selective exchange of materials across their walls. The walls can be thick or thin. The fibers can be "open" or "loaded". In "open" hollow-fibers, the flow of the lumen fluid is not restricted. In "loaded" hollow-fibers, the lumen fluid passes through an immobilized solid, liquid or gas which is contained in the lumen of the fibers.

Hollow-fiber membranes have advantage over flat-sheet and tubular membranes. They give higher productivity per unit volume and are self-supporting structures. Some disadvantages are fouling and plugging by particulate matter.

Hollow-fiber membranes are prepared by fiber fabrication from spinnable materials followed by cementing together (potting) of hollow-fiber bundles. Composite hollow-fiber membranes comprise highly porous substrates which support ultrathin semipermeable membranes.

Porosity in prior art membranes is achieved by formation of voids and imperfections in the support polymers. The pores resemble fissures and cracks. This type of porosity decreases in effectiveness over time.

The membranes of the present invention have pores formed by long-chain polyoxyalkylene tentacles which are chemically joined to a carbon backbone having at least about 50 carbon atoms. The polyoxyalkylene tentacles contain about 8 to about 60 oxyalkylene units. These units impart hydrophilicity to the pores so as not to repel water molecules. Also, the water molecules are small enough to pass through the pores, the size of the pores being about 3.1 angstroms to about 4.5 angstroms in diameter. The length of the pores is about 45 angstroms to about 100 angstroms.

Polymeric additives of the present invention are sufficiently lipophilic to be readily dissolved in common organic solvents. They are also sufficiently hydrophilic to be very swellable in the presence of water, although they are not crosslinked. The additives, when incorporated into membranes, are sufficiently stable to allow high flux. This is because they are non-ionic and thus are not depleted by reactions with salts or charged materials.

Materials which are retained by the ultrafiltration membranes of the present invention are inorganic salts, which have a diameter of about 6 angstroms to about 8 angstroms. Also retained by the membranes are bacteria, which have a diameter of about 10 angstroms or more. In general, any materials having a diameter of about 5 angstroms or greater are retained by the membranes. The diameter of a water molecule is about 2.4 angstroms.

Addition of minor amounts of polymeric additives disclosed herein to conventional polymers useful in ultrafiltration processes provides a membrane structure which can be operated at elevated pressures to remove salts and other impurities from water. The improved membrane structure increases rate of flow of purified water and increases rejection of salts, bacteria and molecular contaminants above about 5 angstroms in diameter. Since the membrane contains polymeric additives which are non-ionic, the membrane is not depleted by interaction with ionic species such as salts and the like. Hard water, containing various salts and minerals, can thus be employed in an ultrafiltration process, wherein the selection membrane contains polymeric additives presently disclosed.

The polyoxyalkylene alkyl phenyl ester of (meth)acrylic acid can be prepared from (meth)acrylic acid or a suitable derivative thereof and an active hydrogen-containing polyoxyalkylene alkyl phenyl compound. The phrase "(meth)acrylic acid" refers to both acrylic acid and methacrylic acid. In a preferred embodiment, the active hydrogen-containing polyoxyalkylene alkyl phenyl compound is a member selected from the group consisting of PEG-20 nonyl phenyl ether, PEG-30 nonyl phenyl ether, PEG-40 nonyl phenyl ether and PEG-50 nonyl phenyl ether.

In an alternative embodiment, the polyoxyalkylene alkyl phenyl compound can contain a polyoxyalkylene group which is made up of alternating blocks of polyoxyethylene and polyoxypropylene. In another embodiment, the polyoxyalkylene group can be made up of polyoxybutylene or alternating blocks of polyoxybutylene and a second polyoxyalkylene which is a member selected from the group consisting of polyoxyethylene and polyoxypropylene.

The length of the polyoxyalkylene side-chains which extend from the carbon backbone is about 45 angstroms to about 100 angstroms. In a preferred embodiment, the distance between the polyoxyalkylene side-chains is from about 2 angstroms to about 4 angstroms. Preferably, the distance between side-chains is about 3.1 angstroms.

The physical form of the hydrophilic membrane, which comprises a hydrophobic polymer in admixture with a polymer additive prepared from a vinyl monomer of a polyoxyalkylene alkyl phenyl ether, can be a film or a fiber. Preferably, the vinyl monomer is a (meth)acrylic acid ester. The polymer prepared from the vinyl monomer is present in the ultrafiltration membrane in an amount of about 0.1 parts by weight to about 10 parts by weight, based on the weight of the membrane. In a preferred embodiment, the polymer prepared from the vinyl monomer is present in the membrane in an amount of about 0.5 to about 5 parts by weight, based on the weight of the membrane. The molecular weight of the polymer additive is about 5,000 to 500,000.

The present application discloses a process for preparing a composite microporous ultrafiltration membrane comprising the steps of obtaining a water-insoluble addition polymer of an alkylphenoxy polyalkylene glycol acrylate having the formula:

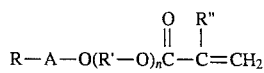

wherein R is an alkyl radical of from 5 to 20 carbon atoms, A is a phenylene radical, R' is a member selected from the group consisting of ethylene, propylene and mixtures thereof, R" is a member selected from the group consisting of hydrogen and methyl, and n is an integer from 20 to 50; dissolving the addition polymer in an organic solvent to obtain a solution of polymer; adding the solution of polymer to a film-forming composition comprising a hydrophobic polymer; casting the film-forming composition to obtain a composite polymer film; and forming an ultrafiltration membrane from the composite polymer film.

In another embodiment, the present application discloses a process for preparing a composite microporous ultrafiltration membrane comprising the steps of obtaining a water-insoluble addition polymer of an alkylphenoxy polyalkylene glycol acrylate having the formula:

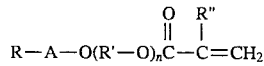

wherein R is an alkyl radical of from 5 to 20 carbon atoms, A is a phenylene radical, R' is a member selected from the group consisting of ethylene, propylene and mixtures thereof, R" is a member selected from the group consisting of hydrogen and methyl, and n is an integer from 20 to 50; dissolving the addition polymer in an organic solvent to obtain a solution of polymer; adding the solution of polymer to a fiber-forming composition comprising a hydrophobic polymer; forming the composition to obtain a composite polymer fiber; and forming a hollow-fiber ultrafiltration membrane from the composite polymer fiber. In both of the above-disclosed processes, the hydrophobic polymer is preferably a member selected from the group consisting of cellulosic polymers, polyamides, polycarbonates and polysulfones.

Also, in a preferred embodiment the process employs an acrylate addition polymer prepared from a monomer of the above-disclosed formula and wherein RA- is a nonyl phenyl radical, R" is hydrogen, and R' is ethylene. Preferably, the water-insoluble addition polymer is added to the film-forming composition in an amount of about 1% to about 10% by weight based on the membrane.

Another aspect of the present disclosure is a process for preparing water which is pure and potable from a feedstream comprising salt water or brackish water. The process comprises the steps of obtaining a microporous ultrafiltration membrane comprising a hydrophobic polymer and about 1% to about 10% by weight based on the membrane of a water-insoluble addition polymer of an alkylphenoxy polyalkylene glycol acrylate having the formula:

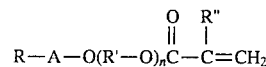

wherein R is an alkyl radical of from 5 to 20 carbon atoms, A is a phenylene radical, R' is a member selected from the group consisting of ethylene, propylene and mixtures thereof, R" is a member selected from the group consisting of hydrogen and methyl, and n is an integer from 20 to 50; contacting an amount of seawater or brackish water with the ultrafiltration membrane under reverse osmosis conditions to effectively separate water from salts, bacteria, organic contaminants, inorganic contaminants and microorganisms; and withdrawing purified water.

Broadly, the present application discloses a hydrophilic composite microporous membrane comprising a first polymer prepared from a polyoxyalkylene alkyl phenyl ester of (meth)acrylic acid and a second polymer which is a member selected from the group consisting of cellulosic polymers, polyamides, polycarbonates and polysulfones. The first polymer can be either a homopolymer of (meth)acrylate ester or a copolymer of (meth)acrylate ester and a vinyl comonomer or comonomers which lack the polyoxyalkylene moiety. Examples of such comonomers are salts of vinyl sulfonic acid, acrylamide and N-substituted acrylamides. The comonomers which do not have the polyoxyalkylene moiety are present in the first polymer in an amount up to about 10 mole %. The first polymer is not cross-linked and is non-ionic. The first polymer is readily swellable in the presence of water because of the hydrophilicity of the polyoxyalkylene side-chains. However, the side-chains are durable to the extraction of water and greatly improve rate of flow of water through the ultrafiltration membrane.

In a preferred embodiment, the polyoxyalkylene-containing polymer has a carbon backbone which has a length from about 200 carbon atoms to about 2,000 carbon atoms.

The objects, composition and effects of the present invention are further explained with reference to the following examples which illustrate the best mode currently contemplated for carrying out the invention but which must not be construed as limiting the invention in any manner.

All examples are parts by weight unless specified otherwise.

EXAMPLE 1

To a suitable reaction vessel equipped with stirrer and fractionation column is added IGEPAL C0–880 (200 parts), acrylic acid (20 parts), toluene (300 parts), nitrobenzene (1 part), hydroquinone (0.1 parts) and sulfuric acid (98%; 1 part). The fractionation column is arranged to remove an azeotrope of water, toluene and acrylic acid. Nitrobenzene prevents polymerization in the vapor phase, and hydroquinone prevents polymerization in the liquid phase.

The mixture of chemicals as recited above is heated to between about 120° C. and 140° C. and then refluxed for a time of about 16 hours. The reaction is complete when the reflux is a single phase. After completion of the reaction, the mixture is cooled to below 50° C. and solid sodium carbonate (20 parts) is quickly added to the mixture with stirring to neutralize the acid. While still warm the reaction mixture is filtered to recover a filtrate which is the desired monomeric product. The filtrate is heated at a temperature of about 60° C. to about 80° C. under reduced pressure of 10 mm to remove water and obtain a dry monomer product which melts at about 50° C. to about 60° C. Infrared analysis of the monomer exhibits absorptions for ester groups and ether groups.

EXAMPLE 2

To a suitable reaction vessel equipped with stirrer and fractionation column is added IGEPAL CO-880 (300 parts) ethyl acrylate (277 parts), 2,6-ditertbutyl-4-methyl-phenol (0.6 parts), EDTA (sodium salt) (0.3 parts). The reaction, which is conducted in a nitrogen atmosphere, is performed at a temperature of about 110° C. to about 120° C. When all traces of water have been removed, a catalytic amount of tetra-isopropyl titanate is added to the reaction mixture. Reflux temperature is maintained at about 85° C., and an azeotrope of ethanol/ethyl acrylate is removed. Temperature of the vessel is maintained at about 104° C. to about 110° C. to prevent yellowing of product. When distillate no longer contains ethanol, the excess ethyl acrylate is removed under vacuum. The reaction is worked up under standard conditions and a dry product is obtained having a melting point of about 50°–60° C.

EXAMPLE 3

Many methods of polymerizing the vinyl monomers can be employed. In the present example, polymers are prepared for later spinning into hollow-fibers.

To a reaction vessel equipped with a heating jacket is added dimethyl acetamide (100 parts), IGEPAL CO-880 acrylate monomer (100 parts), lauroyl peroxide (1 part), sulfur dioxide (5% in dimethyl acetamide) (4 parts). The reaction mixture is stirred and heated at 70° C. for a time of about 2 hours. After conventional work-up, the reaction product is recovered as polymer in about 98% yield. The polymer has an inherent viscosity in dimethyl acetamide of about 0.12. The polymer is insoluble in water, methanol and hexane. The polymer is soluble in dimethyl formamide, dimethyl acetamide, acetone and trichloroethane.

EXAMPLE 4

To a reaction vessel equipped with a heating jacket is added dioxane (100 parts), IGEPAL CO-880 acrylate monomer (100 parts), bis-azodiisobutyronitrile (1 part). The reaction mixture is stirred and heated at 70° C. for a time of about 16 hours. After conventional work-up, the reaction product is recovered as polymer in about 95% yield. The polymer is insoluble in water and soluble in dimethyl acetamide.

EXAMPLE 5

To a reaction vessel equipped with a heating jacket and stirrer is added dimethyl acetamide (100 parts), acrylamido 2-methylpropane sulfonate (1.14 parts), triethyl amine (0.554 parts), IGEPAL CO-880 acrylate (98.86 parts), lauroyl peroxide (1 part), sulfur dioxide (5% in dimethyl acetamide) (4 parts). The reaction mixture is stirred and heated at 70° C. for a time of about 2 hours. After conventional work-up, the reaction product is recovered as polymer in about 95% to 98% yield. The polymer is slightly soluble in water. The presence of sulfonate groups in the polymer allows for increased water flow with membranes prepared from the polymer.

EXAMPLE 6

To a reaction vessel equipped with a heating jacket is added dimethyl acetamide (100 parts), acrylamide (0.87 parts), IGEPAL CO-880 acrylate (99.13 parts), lauroyl peroxide (1 part), sulfur dioxide (5% in dimethyl acetamide) (4 parts). The reaction mixture is stirred and heated at 70° C. for a time of about 2 hours. After conventional work-up, the reaction product is recovered as polymer in about 96% to about 98% yield. The polymer is lightly soluble in water. The presence of acrylamide residues in the polymer allows for increased hydrophilicity of the final polymer.

Although only preferred embodiments of the invention are specifically illustrated and described above, it will be appreciated that many modifications and variations of the present invention are possible in light of the above teachings and within the purview of the appended claims without departing from the spirit and intended scope of the invention.

I claim as my Invention:

1. A composite microporous ultrafiltration membrane comprising a hydrophobic polymer and a water-insoluble addition polymer of an alkylphenoxy polyalkylene glycol acrylate having the formula:

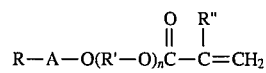

wherein R is an alkyl radical of from 5 to 20 carbon atoms, A is a phenylene radical, R' is a member selected from the group consisting of propylene, ethylene and mixtures thereof, R" is a member selected from the group consisting of hydrogen and methyl, and n is an integer from 20 to 50.

2. A membrane according to claim 1 wherein RA- is a nonyl phenyl radical, R" is hydrogen and R' is ethylene.

3. A membrane according to claim 1 wherein the hydrophobic polymer is a member selected from the group consisting of cellulosic polymers, polyamides, polycarbonates and polysulfones.

4. A membrane according to claim 1 wherein the water-insoluble addition polymer is present in an amount of about 1% to about 10% by weight based on the membrane.

5. A process for preparing a composite microporous ultrafiltration membrane comprising the steps of:

obtaining a water-insoluble addition polymer of an alkylphenoxy polyalkylene glycol acrylate having the formula:

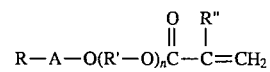

wherein R is an alkyl radical of from 5 to 20 carbon atoms, A is a phenylene radical, R' is a member selected from the group consisting of ethylene, propylene and mixtures thereof, R" is a member selected from the group consisting of hydrogen and methyl, and n is an integer from 20 to 50;

dissolving the addition polymer in an organic solvent to obtain a solution of polymer;

adding the solution of polymer to a film-forming composition comprising a hydrophobic polymer;

casting the film-forming composition to obtain a composite polymer film; and forming an ultrafiltration membrane from the composite polymer film.

6. A process for preparing a composite microporous ultrafiltration membrane comprising the steps of:

obtaining a water-insoluble addition polymer of an alkylphenoxy polyalkylene glycol acrylate having the formula:

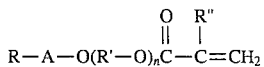

wherein R is an alkyl radical of from 5 to 20 carbon atoms, A is a phenylene radical, R' is a member selected from the group consisting of ethylene propylene and mixtures thereof, R" is a member selected from the group consisting of hydrogen and methyl, and n is an integer from 20 to 50;

dissolving the addition polymer in an organic solvent to obtain a solution of polymer;

adding the solution of polymer to a fiber-forming composition comprising a hydrophobic polymer;

forming the composition to obtain a composite polymer fiber; and forming a hollow-fiber ultrafiltration membrane from the composite polymer fiber.

7. A process according to claim 5 wherein the hydrophobic polymer is a member selected from the group consisting of cellulosic polymers, polyamides, polycarbonates and polysulfones.

8. A process according to claim 6 wherein the hydrophobic polymer is a member selected from the group consisting of cellulosic polymers, polyamides, polycarbonates and polysulfones.

9. A process according to claim 5 wherein the water-insoluble addition polymer is added to the film-forming composition in an amount of about 1% to about 10% by weight based on the membrane.

10. A process according to claim 6 wherein the water-insoluble addition polymer is added to the fiber-forming composition in an amount of about 1% to about 10% by weight based on the membrane.

11. A process for the preparation of purified water comprising the steps of:

obtaining a microporous ultrafiltration membrane comprising a hydrophobic polymer and about 1% to about 10% by weight based on the membrane of a water-insoluble addition polymer of an alkylphenoxy polyalkylene glycol acrylate having the formula:

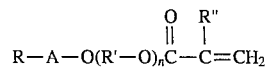

wherein R is an alkyl radical of from 5 to 20 carbon atoms, A is a phenylene radical, R' is a member selected from the group consisting of ethylene, propylene and mixtures thereof, R" is a member selected from the group consisting of hydrogen and methyl, and n is an integer from 20 to 50;

contacting an amount of seawater or brackish water with the ultrafiltration membrane under reverse osmosis conditions to effectively separate water from salts, bacteria, organic contaminants, inorganic contaminants and microorganisms; and withdrawing a purified stream of water.

12. A process according to claim 11 wherein the hydrophobic polymer is a member selected from the group consisting of cellulosic polymers, polyamides, polycarbonates and polysulfones.

13. A process according to claim 11 wherein RA- is a nonyl phenyl radical, R" is hydrogen, and R' is ethylene.

14. A hydrophilic composite microporous membrane comprising a first polymer prepared from a polyoxyalkylene alkyl phenyl ester of (meth)acrylic acid and a second polymer which is a member selected from the group consisting of cellulosic polymers, polyamides, polycarbonates and polysulfones.

15. A membrane according to claim 14 wherein the first polymer is present in an amount of about 0.1 parts by weight to about 10 parts by weight.

16. A membrane according to claim 14 wherein the physical form is a film or a fiber.

17. A membrane according to claim 14, wherein the polyoxyalkylene moiety is a member selected from the group consisting of polyoxyethylene, polyoxypropylene, or mixtures thereof.

18. A membrane according to claim 17 wherein the polyoxyethylene moiety is a functional part of a compound which is a member selected from the group consisting of PEG-20 nonyl phenyl ether, PEG-30 nonyl phenyl ether, PEG-40 nonyl phenyl ether and PEG-50 nonyl phenyl ether.

19. A hydrophilic membrane comprising a hydrophobic polymer in admixture with a polymer prepared from a polyoxyalkylene alkyl phenyl ester of (meth)acrylic acid.

20. A membrane according to claim 19 wherein the ester is prepared from an active hydrogen compound which is a member selected from the group consisting of PEG-20 nonyl phenyl ether, PEG-30 nonyl phenyl ether, PEG-40 nonyl phenyl ether and PEG-50 nonyl phenyl ether.

21. A hydrophilic membrane comprising a hydrophobic polymer in admixture with a polymer prepared from a vinyl monomer of a polyoxyalkylene alkyl phenyl ether.

22. A membrane according to claim 21 wherein the vinyl monomer is prepared from a polyoxyethylene nonyl phenyl ether.

23. A material for purification and desalinization of water comprising a polymer prepared by addition polymerization of a polyoxyalkylene alkyl phenyl ester of (meth)acrylic acid, whereby the polymer has oxyalkylene side chains on a carbon backbone.

24. A material according to claim 23 wherein the ester is prepared from a polyoxyethylene nonyl phenyl ether.

25. A material according to claim 23 wherein the polymer has a molecular weight of about 5,000 to about 500,000.

26. A material according to claim 23 wherein the polymer has a distance between oxyalkylene chains on the carbon backbone of about 2 angstroms to about 4 angstroms.

27. A material according to claim 26 wherein the distance between chains is about 3.1 angstroms.

28. A material according to claim 23 wherein the length of the chains is about 45 angstroms to about 100 angstroms.

29. A material according to claim 23 wherein the length of the carbon backbone is from about 200 carbon atoms to about 2,000 carbon atoms.

30. A material according to claim 23 wherein the addition polymerization is conducted in the presence of vinyl comonomers which lack the polyoxyalkylene side chains.

31. A material according to claim 30 wherein the comonomers are present in an amount up to about 10 mole %.

32. A process for the preparation of purified, desalinated water comprising the steps of:

obtaining a microporous ultrafiltration membrane comprising a hydrophobic polymer and a polymer prepared by the addition polymerization of a polyoxyalkylene alkyl phenyl ester of (meth)acrylic acid;

contacting an amount of seawater with the ultrafiltration membrane under reverse osmosis conditions to effectively separate water from salts, bacteria, organic contaminants, inorganic contaminants and microorganisms; and withdrawing a purified stream of water.

33. A process according to claim 32 wherein the hydrophobic polymer is a member selected from the group consisting of cellulosic polymers, polyamides, polycarbonates and polysulfones.

* * * * *